United States Patent [19]
Cross

[11] 3,991,465
[45] Nov. 16, 1976

[54] ORANGE PEELER

[76] Inventor: Shirley Cross, P.O. Box 3098, Morgantown, W. Va. 26505

[22] Filed: Mar. 3, 1976

[21] Appl. No.: 663,634

[52] U.S. Cl. .............................. 30/123.7; 30/316; 30/324
[51] Int. Cl.² ......................................... A22B 5/16
[58] Field of Search ............... 30/123.5, 123.7, 315, 30/316, 324, 328, 357

[56] References Cited
UNITED STATES PATENTS

| | | | |
|---|---|---|---|
| 1,231,913 | 7/1917 | Kosin | 30/123.5 |
| 2,810,957 | 10/1957 | Nelson | 30/324 |

Primary Examiner—James L. Jones, Jr.
Attorney, Agent, or Firm—Watson, Cole, Grindle & Watson

[57] ABSTRACT

An orange peeler tool is formed of a handle to which is attached a blade for peeling an orange in a single operation. The blade is curved both transversely and longitudinally, and the radius of curvature longitudinally is greater than the radius of curvature transversely. The blade is substantially spoon-shaped, with straight edges in its front portion, but with a cut-away part at each side at the rear end, the cut-away part having a sharp corner edge at the point where it joins the straight edge portion for making it possible to cut a slit in the orange peel substantially the depth of the peel.

1 Claim, 3 Drawing Figures

ORANGE PEELER

BACKGROUND OF THE INVENTION

1. Field of the Invention

The invention relates to an orange peeler.

2. The Prior Art

Applicant is aware of the Kosin U.S. Pat. No. 1,231,913, relating to an orange peeler which bears some resemblance to the present device. However, that arrangement is intended to peel the orange in strips and could not be used without producing such a peeling action.

SUMMARY OF THE INVENTION

The present invention provides an orange peeler which is more readily applied and used than that of Kosin, and which allows the whole orange peel to be removed in a single operation, without being cut into strips.

According to the invention, the device is a generally spoon-shaped bowl mounted in a handle, and having a transverse radius of curvature somewhat less than the longitudinal radius of curvature. It has a generally straight edge, at the forward part, that is the part remote from the handle, and a cut-away portion at the rear edge. The point at which the cut-away portion joins the front edge is sharpened, so as to permit the rind to be cut through by a single stroke of the tool, after which it can be inserted underneath the rind through the slit so formed and the whole rind can be removed in a single piece.

BRIEF DESCRIPTION OF THE DRAWINGS

The invention will be more fully described in the following specification, particularly when taken in conjunction with the accompanying drawings which form a part thereof.

In the drawings.

DESCRIPTION OF THE PREFERRED EMBODIMENTS

Figure 3:
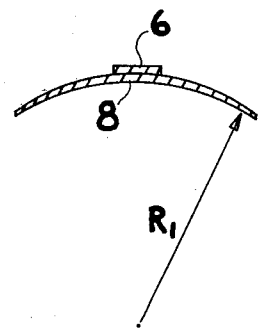
FIG. 3 is a cross-section on the line 3—3 of FIG. 2.
Figure 1:
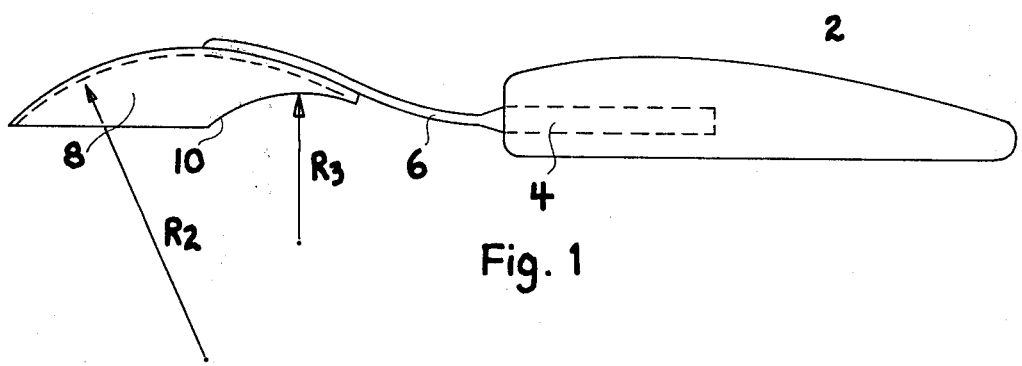
FIG. 1 is a side view of the tool.
Figure 2:
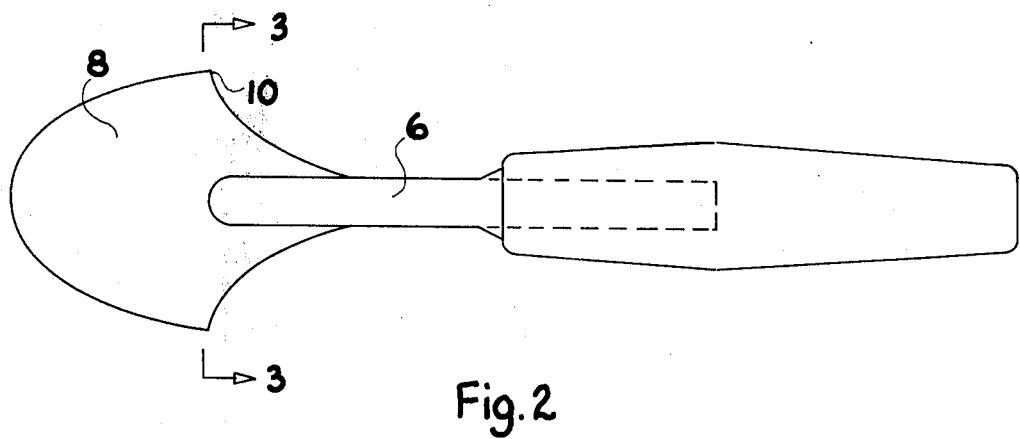
FIG. 2 is a top plan view.

The device is provided with a suitable handle 2. The stem of the tool, which is formed for example of a stamping or forging of stainless steel or of steel to be plated, includes a shank portion 4 set into the handle and an extending portion 6. The bowl-shaped part is welded or riveted to the shank 6. It includes a body portion 8 having a transverse radius of curvature R1 and a longitudinal radius of curvature R2, the radius R2 being preferably somewhat greater than the radius R1. The portion is cut away at its rear edge, the cut-away portion having a radius R3 which is less than radius R1. The portion of the cut-away rear edge in the area 10 is sharpened, to provide a cutting action.

The upper or outer face of the bowl-shaped portion 8 is substantially uninterrupted, that is, it has no projecting ears such as are shown in the patent to Kosin referred to above.

Thus, in contrast with Kosin, the design of the present peeler allows movement and peeling in any direction within a 180° arc, and allows the removal of the peel in a single operation, whereas the Kosin arrangement, because of the ears, would not permit this.

The size of the device may be varied for use in other citrus fruits, such as tangerines or small oranges.

I claim:

1. An orange peeler comprising a handle and a bowl-shaped body carried by the handle, said body having a transverse radius of curvature less than the longitudinal radius of curvature and having a cut-away back edge, and a longitudinally extending edge on the front portion, the corner joining the cut-away back portion and the longitudinal edge being sharpened to permit slitting the rind of an orange, whereafter the rind may be removed by inserting the tool in the slit and manipulating it, the outer face of the bowl being substantially unobstructed.

* * * * *